March 25, 1952 S. SKOK 2,590,277
SUPPORTING CLIP
Filed July 8, 1946
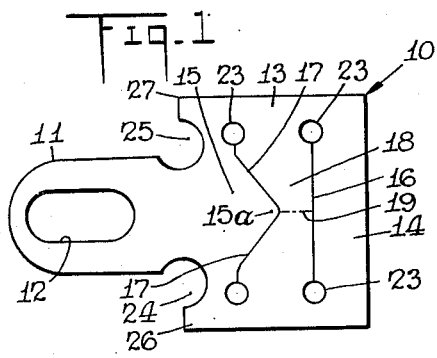
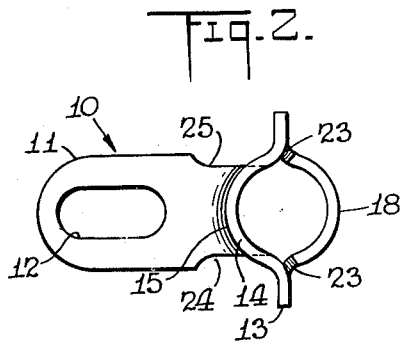
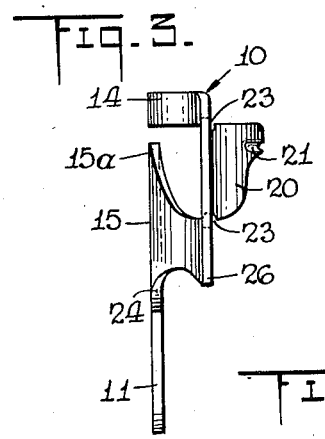
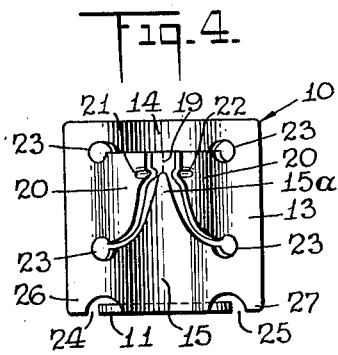
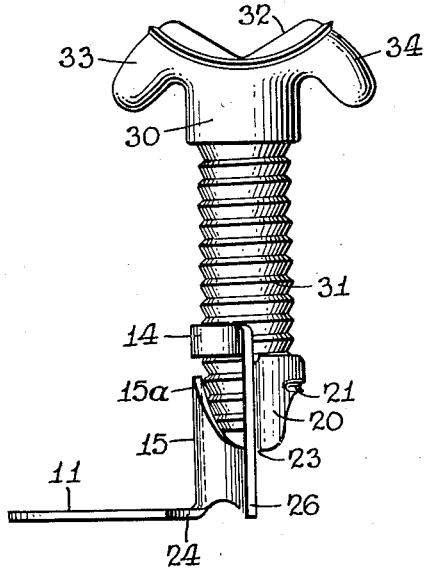
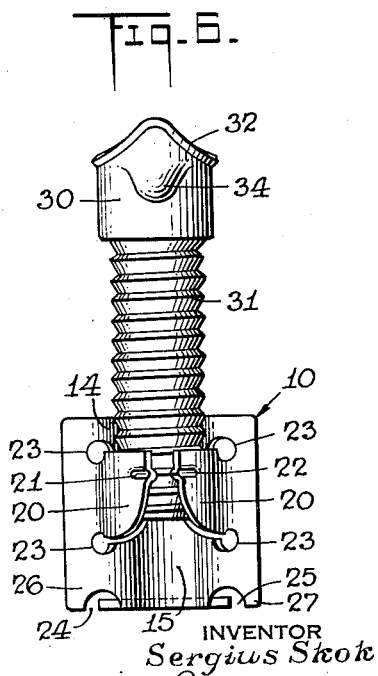
INVENTOR
Sergius Skok
BY
Harry Ernest Rubens
ATTORNEY Patented Mar. 25, 1952

2,590,277

UNITED STATES PATENT OFFICE 2,590,277

SUPPORTING CLIP

Sergius Skok, St. Albans, N. Y., assignor to Burndy Engineering Company, Inc., a corporation of New York Application July 8, 1946, Serial No. 682,014

1 Claim. (Cl. 248—50)

My invention relates to supporting clips having spring-like gripping means wherein a cylindrical rod-like object may be inserted, and maintained in position by action of the gripping means.

The objects of my invention are to provide a supporting clip for inserting a rod-like object therein, which may be inexpensively made of sheet metal and provide gripping means for a push-fit of said rod-like object; to provide threaded means for adjusting the position of the rod-like object with respect to the clip; and to provide a clip with supporting projections and a flat terminal lug portion for maintaining the clip rigidly and securely in position on a flat surface.

I accomplish these and other objects and obtain my new results as will be apparent from the device described in the following specification, particularly pointed out in the claim, and illustrated in the accompanying drawing in which:

Fig. 1 is a plan view of my sheet metal clip in developed length;

Fig. 2 is a top view of the clip with transversely extending terminal lug;

Fig. 3 is a side elevation of the clip with longitudinally extending terminal lug;

Fig. 4 is a rear elevation of the clip with a sheared and indented ear section;

Fig. 5 is a side elevation of my clip supporting a glass insulator;

Fig. 6 is a rear elevation of the clip and insulator.

Referring more particularly to Fig. 1 of the drawing, reference numeral 10 designates a substantially rectangular piece of sheet metal having a terminal lug portion 11 stamped therefrom, having an aperture 12 therein for attachment to a plate, or flat surface, by means of a bolt or screw, not shown.

The remaining section of the sheet metal 10 constitutes the body portion 13 which is sheared to form two transversely connected strap sections 14 and 15 by shear lines 16 extending laterally across the plate and angularly shaped shear line 17 extending diagonally from two opposite corners of the body portion 13 to substantially the longitudinal center line of the body section forming the strap portion 15 into substantially a triangular shape.

The strap section 15 is formed into a semitubular shape as is shown in Fig. 2, with the terminal lug 11 portion extending transversely from the curved edge therefrom, as shown in Fig. 2, or longitudinally therefrom as shown in Fig. 3, depending on the position it is desired to hold the end portion to be gripped by the clip.

The section 18 formed between the shear lines 16 and 17 is semi-tubularly formed in the opposite direction of strap portion 15, as shown in Fig. 2, both sections being formed into substantially an oval cross-section, with its minor diameter perpendicular to the plane of the sheet metal body 13.

The strap section 14 is similarly shaped, as is strap section 15, forming continuing support for the article to be gripped therein.

As shown in Fig. 4, the section 18 may be longitudinally sheared at 19, along the longitudinal line thereof, to form triangularly shaped ear section 20, which gives a greater amount of spring action to the support of the article to be gripped therein.

By angularly shaping the shear line 17, the apex 15a of the strap section 15 extends longitudinally and almost touches the strap section 14, thus providing an almost continuous support for the article to be inserted into the clip, even though partially withdrawn, as shown in Fig. 5.

By threading the rod-like means and providing thread-engaging indentations 21 and 22 in the ends of the ear sections 20, respectively, a threaded rod may be rotated in the clip and adjusted to a precise position.

In the manufacture of the clip, punched-out holes 23 may be provided at the ends of the shear lines, to control the shear and prevent it from extending beyond the desired points. Also, when the terminal lug portion is formed, the cut-out sections 24 and 25 may be provided, which allow the resulting projections 26 and 27 to act as supporting legs, as shown in Figs. 5 and 6 when the terminal lug portion 11 engages a flat surface. Additionally, a greater degree of springyness is obtained by punching-out the holes at the ends of the shearing lines.

The clip may be employed for a variety of purposes, one being shown in Figs. 5 and 6, wherein a glass insulator rod 30, having a threaded end section 31, is pushed into the tubular section of the clip, and a cradle head section 32 is provided for supporting a neon tube. Ear sections 33 and 34 may be formed on either side of the cradle for permitting a wire, not shown, to be looped around the tube in the cradle and locked around the ear sections. The rod may be rotated in the clip until the desired position is obtained. Furthermore, the indentations 21 and 22, fitting snugly in the threaded end section 31, act as an additional gripping means to secure the rod therein.

The insulator may be push-fitted into the clip against the spring action of the ear sections, or threaded therein, as described.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

What is claimed is:

A supporting clip for receiving a rod-like end thereto made from a single piece of sheet material having a tubularly formed body, and a terminal attaching means, said tubular body having a plurality of transversely extending strap sections forming one side of the tubular body, and an intermediate transversely extending strap section forming the other side, one of the straps forming said one side having a projection extending from a transverse edge toward the other strap, said intermediate strap having a recess substantially complementary with said projection.

SERGIUS SKOK.

REFERENCES CITED

The following references are of record in the file of this patent:

UNITED STATES PATENTS

| Number | Name | Date |
| --- | --- | --- |
| 1,649,809 | Campbell | Nov. 22, 1927 |
| 2,227,677 | Siegel | Jan. 7, 1941 |
| 2,310,803 | Miller | Feb. 9, 1943 |
| 2,330,835 | Miller | Oct. 5, 1943 |
| 2,335,296 | Miller | Nov. 30, 1943 |
| 2,393,226 | Allison | Jan. 22, 1946 |